United States Patent [19]

Spinu

[11] Patent Number: 5,331,045
[45] Date of Patent: Jul. 19, 1994

[54] POLYVINYL ALCOHOL ESTERIFIED WITH LACTIC ACID AND PROCESS THEREFOR

[75] Inventor: Maria Spinu, Wilmington, Del.

[73] Assignee: E. I. Du Pont de Nemours and Company, Wilmington, Del.

[21] Appl. No.: 17,234

[22] Filed: Feb. 12, 1993

[51] Int. Cl.⁵ .................. C08L 29/02; C08L 29/04
[52] U.S. Cl. ........................ 525/61; 525/58; 525/62
[58] Field of Search ............... 525/61, 62, 58

[56] References Cited

U.S. PATENT DOCUMENTS

| | | | |
|---|---|---|---|
| 3,249,572 | 5/1966 | Davis et al. | 260/29.6 |
| 3,749,699 | 7/1973 | Apellaniz et al. | 260/79.3 |
| 3,821,167 | 6/1974 | Asano | 260/49 |
| 4,249,000 | 2/1981 | Batzer et al. | 536/66 |

*Primary Examiner*—James J. Seidleck
*Assistant Examiner*—W. Robinson H. Clark
*Attorney, Agent, or Firm*—Susan B. Evans

[57] ABSTRACT

Polyvinyl alcohol esterified by lactic is produced by dissolving polyvinyl alcohol and lactic acid in water, and removing the water by volatilization at a temperature of 75° C. to 175° C. The lactic acid esterified polyvinyl alcohol is useful as a molding resin, and in films, fibers and adhesives.

4 Claims, No Drawings

POLYVINYL ALCOHOL ESTERIFIED WITH LACTIC ACID AND PROCESS THEREFOR

BACKGROUND OF THE INVENTION

Disclosed herein are lactic acid esters of polyvinyl alcohol and a process for making such esters. The lactic acid esterified polyvinyl alcohol is useful in films, moldings and adhesives.

Polyvinyl alcohol is an article of commerce and useful in fibers, adhesives and textile and paper sizing. However, one of the drawbacks of polyvinyl alcohol is that it is not melt processible, or if modified to make it melt processible, it is often not soluble in cold water and not crystalline, which are desirable properties of this types of polymer.

Simple (alkyl) esters of polyvinyl alcohol are well known, for example, the commercially available poly(vinyl acetate).

U.S. Pat. No. 3,249,572 describes a composition (Example II, Formulation 14) which includes polyvinyl alcohol, polyethyleneimine, water and lactic acid. This prior art patent discloses a system in which the acid improves the properties of the adhesive described by inhibiting the crosslinking of the polyethyleneimine present. There is no disclosure in said patent of esterification of polyvinyl alcohol.

SUMMARY OF THE INVENTION

This invention concerns a polymeric composition comprising polyvinyl alcohol in which at least 1% of hydroxyl groups in said polyvinyl alcohol are esterified with lactic acid, and wherein each lactic acid ester group contains an average of 1.0 to about 3 lactic acid residues.

This invention also concerns a process for esterifying polyvinyl alcohol with lactic acid, comprising, dissolving polyvinyl alcohol and lactic acid in water, heating at a temperature of about 75° C. to about 175° C. to remove water by vaporization, to produce a lactic acid esterified polyvinyl alcohol.

DETAILS OF THE INVENTION

Polyvinyl alcohol has the repeat unit —CH$_2$CH(OH)—, which when esterified by lactic acid in the instant invention is converted to the repeat unit

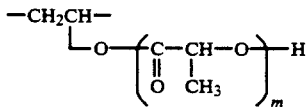

wherein m is, on average, 1.0 to about 3. It is believed that the variation in m makes lactic acid particularly effective in lowering the melting point of the polyvinyl alcohol. It is preferred if about 5 to about 50 percent, more preferably about 8 to about 20 percent, of the hydroxyl groups in the polyvinyl alcohol are esterified with lactic acid.

In the lactate residue repeat unit above, m is an average of the number of monomeric lactic acid units per esterified polyvinyl alcohol hydroxyl group. It can be a fractional value because each esterified polyvinyl alcohol hydroxyl group may have a different number of lactic acid units attached, and m is an average value. However, m can never be less than 1.0, since each esterified hydroxyl group must be esterified by at least 1 lactic acid unit. As the ratio of lactic acid to polyvinyl alcohol in the initial reaction mixture increases, m will also increase.

The process used to esterify the polyvinyl alcohol with lactic acid, as described herein, has several advantages. The only other ingredient is water, which is both cheap and nonflammable. No other ingredients, such as esterification catalysts, need to be added, so separation of the esterified polyvinyl alcohol product from any such materials is not needed.

Preferably, the initial "molar" ratio of polyvinyl alcohol repeat unit:lactic acid in the esterification process will be about 100:1 to about 1:1. The lower this ratio is, the higher the percentage of hydroxyl groups in the polyvinyl alcohol that will be esterified. It is more preferred if this ratio is about 20:1 to about 2:1, and especially preferred if it is about 3.3:1.

Lactic acid carboxyl groups should be free to esterify the hydroxyl groups of the polyvinyl alcohol, thus compounds which readily react with carboxyl groups to form other groupings should be avoided. For instance, strong bases such as NaOH or aliphatic amines would react very rapidly with the carboxyl groups to form carboxylate groups, which would not esterify.

The amount of water initially present in the reaction mixture will preferably be about the minimum needed to dissolve both the polyvinyl alcohol and lactic acid, or to achieve a low enough viscosity in the solution so that it may be transferred to another container, if needed (the viscosity will be most affected by the amount of polyvinyl alcohol present, and its molecular weight, the higher the molecular weight, the higher the viscosity).

The solution is then heated to 75° C. to 175° C., while simultaneously removing the water by vaporization. Initially, at atmospheric pressure, water will boil from the solution at somewhat over 100° C., and the boiling point will increase as the amount of water in the solution decreases. If it is not desired to raise the temperature of the process liquid, but to still remove the water relatively quickly by volatilization, a (relatively dry) stream of gas such as nitrogen can be passed through or over the process liquid, i.e., the process liquid may be sparged with the gas. The water that is removed is not only the water originally present, but also includes the water which is the byproduct of the esterification reaction. Volatilization of the water may also be aided by adding a compound which forms an azeotrope with water (see Example 1). It is preferred that the temperature of the process liquid is about 90° C. to about 130° C.

It is especially preferred that the process be carried out in the absence of oxygen to avoid possible oxidation or other degradation of the process ingredients and product. Thus, it is convenient to carry out the reaction under an inert gas such as nitrogen or argon. As long as the viscosity of the reaction mass is not too high, it is preferred to agitate the reaction mass to speed the removal of water by volatilization.

It is also preferred that the starting polyvinyl alcohol have a relatively low ash content and that it contain a relatively low amount of inorganic salts (including metal carboxylates). The polymer may be purified by washing (see below).

The lactic acid esterified polymer produced herein is useful as a molding resin, for films, for fibers and for adhesives, especially hot melt adhesives. It has the advantage of being fully or partially soluble in cold water, being melt processible, and in some cases, also having a melting point, which indicates possibly higher use temperatures.

In the Examples, the following abbreviations are used:
DMSO—dimethylsulfoxide
DSC—differential scanning calorimetry
PVOH—polyvinyl alcohol
RB—round-bottomed
$T_g$—glass transition temperature or point The polyvinyl alcohol beads used as a starting material in the Examples were purified by washing with a mixture of 80% methanol-20% water (v/v), the mixture being a nonsolvent for the polymer. Inorganic content, reported nominally as sodium acetate is given below:

| Number of washes | ppm sodium acetate |
|---|---|
| 0 | 10,340 |
| 2 | 392 |
| 3 | 78 |
| 4 | 53 |

The polymer washed 4 times was used in the Examples. The polymer has a number average molecular weight of 50,000 to 70,000.

EXAMPLE 1

Eight g PVOH (>99% hydrolyzed), 19.3 g lactic acid 85% solution in water, and 50 ml distilled water were charged into a 100 ml, 3-necked RB flask equipped with overhead stirrer, nitrogen inlet, a Dean Stark trap and a reflux condenser. Fifty ml freshly distilled toluene was added as the azeotroping agent, to remove the water (both reaction solvent and by-product). The reaction mixture was heated at 110° C. under fast nitrogen flow. After 3.5 hours at 110° C., most of the water was removed. The resulting polymer melt was dissolved in DMSO, reprecipitated in acetone, and dried in the vacuum oven for at least 24 hours at 60° C.

The polymer was partly soluble in cold water. The degree of grafting determined by $^{13}$C. NMR (in d$_5$-pyridine) was ca. 31%, and the average graft length was 1.3 lactic acid units per graft. DSC showed a $T_g$ around 43° C. and no melting point.

EXAMPLE 2

Ten g PVOH (>99% hydrolyzed), 12.0 g lactic acid 85% solution in water, and 50 ml distilled water were charged into a 100 ml, 3-necked RB flask equipped with overhead stirrer, nitrogen inlet, a Dean Stark trap and a reflux condenser. The reaction mixture was heated at 100° C. under fast nitrogen flow, to remove the water (both reaction solvent and by-product). After 6 hours, the crude polymer was removed from the reaction flask, extracted with acetone for 72 hours, and dried in a vacuum oven for at least 24 hours at 60° C.

The polymer was partly soluble in cold water. The degree of grafting determined by $^{13}$C. NMR (in d$_5$-pyridine) was ca. 29%, and the average graft length was 1.2 lactic acid units per graft. DSC showed a $T_g$ around 53° C. and no melting point.

EXAMPLE 3

Ten g PVOH (>99% hydrolyzed), 12.0 g lactic acid 85% solution in water, and 50 ml distilled water were charged into a 100 ml, 3-necked RB flask equipped with overhead stirrer, nitrogen inlet, a Dean Stark trap and a reflux condenser. The reaction mixture was heated at 100° C., under fast nitrogen flow, to remove the water (both reaction solvent and by-product). After 22 hours, the crude polymer was removed from the reaction flask extracted with isopropyl alcohol for 72 hours and dried in a vacuum oven for at least 24 hours at 60° C.

The polymer was partly soluble in cold water. The degree of grafting determined by $^{13}$C. NMR (in d$_5$-pyridine) was ca. 32%, and the average graft length was 1.5 lactic acid units per graft. DSC showed a $T_g$ around 60° C. and no melting point.

EXAMPLE 4

Thirty g PVOH (>99% hydrolyzed), 10.8 g lactic acid 85% solution in water, and 140 ml distilled water were charged into a 250 ml, 3-necked RB flask equipped with overhead stirrer, nitrogen inlet, a Dean Stark trap and a reflux condenser. The reaction mixture was heated at 100° C. under fast nitrogen flow, to remove the water (both reaction solvent and by-product). After approximately 6 hours at 100° C., most of the water was removed and the reaction mixture became too viscous to stir. The stirring was turned off and the reaction allowed to proceed for an additional 16 hours (for a total of 22 hours at 100° C). The crude polymer was removed from the reaction flask, extracted with isopropyl alcohol for 72 hours and dried in a vacuum oven for at least 24 hours at 60° C.

The polymer was partly soluble in cold water. The degree of grafting could not be measured since the polymer was insoluble in the NMR solvent. DSC showed a $T_g$ around 50° C. and a very broad melting point over the range 120°-180° C. A polymer film was produced through compression molding at 170°-180° C.

EXAMPLE 5

Thirty g PVOH (>99% hydrolyzed), 14.5 g lactic acid 85% solution in water, and 140 ml distilled water were charged into a 250 ml, 3-necked RB flask equipped with overhead stirrer, nitrogen inlet, a Dean Stark trap and a reflux condenser. The reaction mixture was heated at 100° C., under fast nitrogen flow, to remove the water (both reaction solvent and by-product). After approximately 6 hours at 100° C. most of the water was removed and the reaction mixture became too viscous to stir. The stirring was turned off and the reaction allowed to proceed for an additional 16 hours (for a total of 22 hours at 100° C). The crude polymer was removed from the reaction flask, extracted with isopropyl alcohol for 72 hours and dried in a vacuum oven for at least 24 hours at 60° C.

The polymer was partly soluble in cold water. The degree of grafting could not be measured since the polymer was insoluble in the NMR solvent. DSC showed a $T_g$ around 54° C. and a very broad melting point over the range 100°-160° C. A polymer film was produced through compression molding at 170°-180° C.

EXAMPLE 6

Twenty-five g PVOH (>99% hydrolyzed), 18.0 g lactic acid 85% solution in water, and 130 ml distilled water were charged into a 250 ml, 3-necked RB flask equipped with overhead stirrer, nitrogen inlet, a Dean Stark trap and a reflux condenser. The reaction mixture was heated at 100° C., under fast nitrogen flow, to remove the water (both reaction solvent and by-product). After approximately 6 hours at 100° C., most of the water was removed, and the reaction mixture became too viscous to stir. The stirring was turned off and the reaction allowed to proceed for an additional 16 hours (for a total of 22 hours at 100° C). The crude polymer was removed from the reaction flask, extracted with isopropyl alcohol for 72 hours and dried in a vacuum oven for at least 24 hours at 60° C.

The polymer was soluble in cold water. The degree of grafting determined by $^{13}$C. NMR (in d$_5$-pyridine) was ca 14%, with the average graft length of 1.1 lactic acid units per graft. DSC shows a $T_g$ around 58° C. and a weak and broad melting point in the range 100°–150° C. A polymer film was produced through compression molding at 150°–170° C., and the corresponding physico-mechanical properties compare well with those of a solvent cast, unmodified PVOH film:

|  | PVOH, cast film (water solvent) | pressed film |
|---|---|---|
| Tensile Strength at break (MPa) | 71.0 | 66.8 |
| Initial Modulus (GPa) | 2 | 2 |
| % E at break | 151* | 5.1 |

*The very high elongation-at-break observed for the PVOH cast film is undoubtedly due to residual water solvent which is very difficult to completely remove.

What is claimed is:

1. A polymer comprising polyvinyl alcohol in which at least 1% of hydroxyl groups in said polyvinyl alcohol are esterified with lactic acid, and wherein each lactic acid ester group contains an average of 1.0 to about 3 lactic acid units.

2. The polymer as recited in claim 1 wherein 1 to 50 percent of the hydroxyl groups are esterified with the lactic acid.

3. The polymer as recited in claim 1 wherein 8 to 20 percent of the hydroxyl groups are esterified with the lactic acid.

4. The polymer as recited in claim 1 wherein said graft lactic acid ester group contain an average of 1.0 to about 2 lactic acid units.

* * * * *